United States Patent
Topping et al.

(10) Patent No.: US 9,003,629 B2
(45) Date of Patent: Apr. 14, 2015

(54) ANGLED SUPPORT FOR DISPLAYING PRODUCTS

(71) Applicant: RTC Industries, Inc., Rolling Meadows, IL (US)

(72) Inventors: Howard Topping, Barrington Hills, IL (US); Jeff Fridrich, Chicago, IL (US)

(73) Assignee: RTC Industries, Inc., Rolling Meadows, IL (US)

( * ) Notice: Subject to any disclaimer, the term of this patent is extended or adjusted under 35 U.S.C. 154(b) by 0 days.

(21) Appl. No.: 14/175,705

(22) Filed: Feb. 7, 2014

(65) Prior Publication Data

US 2014/0223718 A1     Aug. 14, 2014

Related U.S. Application Data

(60) Continuation of application No. 13/752,018, filed on Jan. 28, 2013, now abandoned, which is a division of application No. 11/769,894, filed on Jun. 28, 2007, now Pat. No. 8,360,254.

(60) Provisional application No. 60/806,101, filed on Jun. 28, 2006.

(51) Int. Cl.
| | |
|---|---|
| B23P 21/00 | (2006.01) |
| A47F 5/00 | (2006.01) |
| A47F 5/08 | (2006.01) |

(52) U.S. Cl.
CPC ................. *A47F 5/00* (2013.01); *A47F 5/0815* (2013.01)

(58) Field of Classification Search
USPC .............. 29/426.2, 428, 469, 453; 211/87.01, 211/59.1, 175, 55, 106, 189, 70.6, 41.14, 211/103; 248/474, 476, 132, 284.1, 291.1
See application file for complete search history.

(56) References Cited

U.S. PATENT DOCUMENTS

| | | | |
|---|---|---|---|
| 1,810,826 A | | 6/1931 | Gray |
| 2,016,421 A | | 10/1935 | Eichner |
| 3,173,386 A | | 3/1965 | Magers |
| 3,602,159 A | | 8/1971 | Marschak |
| 3,730,108 A | | 5/1973 | Stroh |
| 3,830,374 A | | 8/1974 | Kassimir |
| 4,197,673 A | | 4/1980 | Thomas |
| 2,626,711 A | | 1/1983 | Saul, Jr. |
| 4,480,755 A | * | 11/1984 | Cartwright ................... 211/70.6 |
| 4,531,645 A | * | 7/1985 | Tisbo et al. ................ 211/131.1 |
| 4,565,290 A | | 1/1986 | Corrigan et al. |
| 4,982,852 A | | 1/1991 | Johansen |
| 5,014,859 A | | 5/1991 | Johnson |
| 5,094,352 A | | 3/1992 | Green, Sr. et al. |
| 5,305,898 A | | 4/1994 | Merl |
| 5,472,103 A | | 12/1995 | Merl |
| 5,738,019 A | | 4/1998 | Parker |
| 5,762,211 A | | 6/1998 | Ensign |

(Continued)

*Primary Examiner* — John C Hong
(74) *Attorney, Agent, or Firm* — Banner & Witcoff, Ltd.

(57) ABSTRACT

A support structure may be mounted to an existing vertical support. In an embodiment, the support structure may include a plurality of horizontal support members. Two or more vertical uprights are mounted to the horizontal supports. The vertical uprights and one of the horizontal support members provide channels for retaining a peg board panel in position. The support structure may be configured so as to cause the peg board panel to at an angle compared to the vertical supports. Multiple support structures may be coupled together to provide runs of peg board panels. Furthermore, the peg board panel may include a graphic that correspond to products being supported by the peg board panel.

6 Claims, 14 Drawing Sheets

(56) References Cited

U.S. PATENT DOCUMENTS

| | | |
|---|---|---|
| 5,944,203 A | 8/1999 | Vlah et al. |
| 6,041,720 A | 3/2000 | Hardy |
| 6,655,536 B2 | 12/2003 | Jo et al. |
| 6,837,385 B2 | 1/2005 | Bennett et al. |
| 6,848,589 B2 | 2/2005 | Wood |
| 6,964,235 B2 | 11/2005 | Hardy |
| 7,093,546 B2 | 8/2006 | Hardy |
| 7,152,536 B2 | 12/2006 | Hardy |
| 7,404,494 B2 | 7/2008 | Hardy |
| 7,497,342 B2 | 3/2009 | Hardy |
| 2005/0016943 A1 | 1/2005 | Dick |
| 2006/0237382 A1 | 10/2006 | Sarnoff et al. |
| 2007/0193963 A1 | 8/2007 | Schendel et al. |
| 2008/0217269 A1 | 9/2008 | Topping et al. |

* cited by examiner

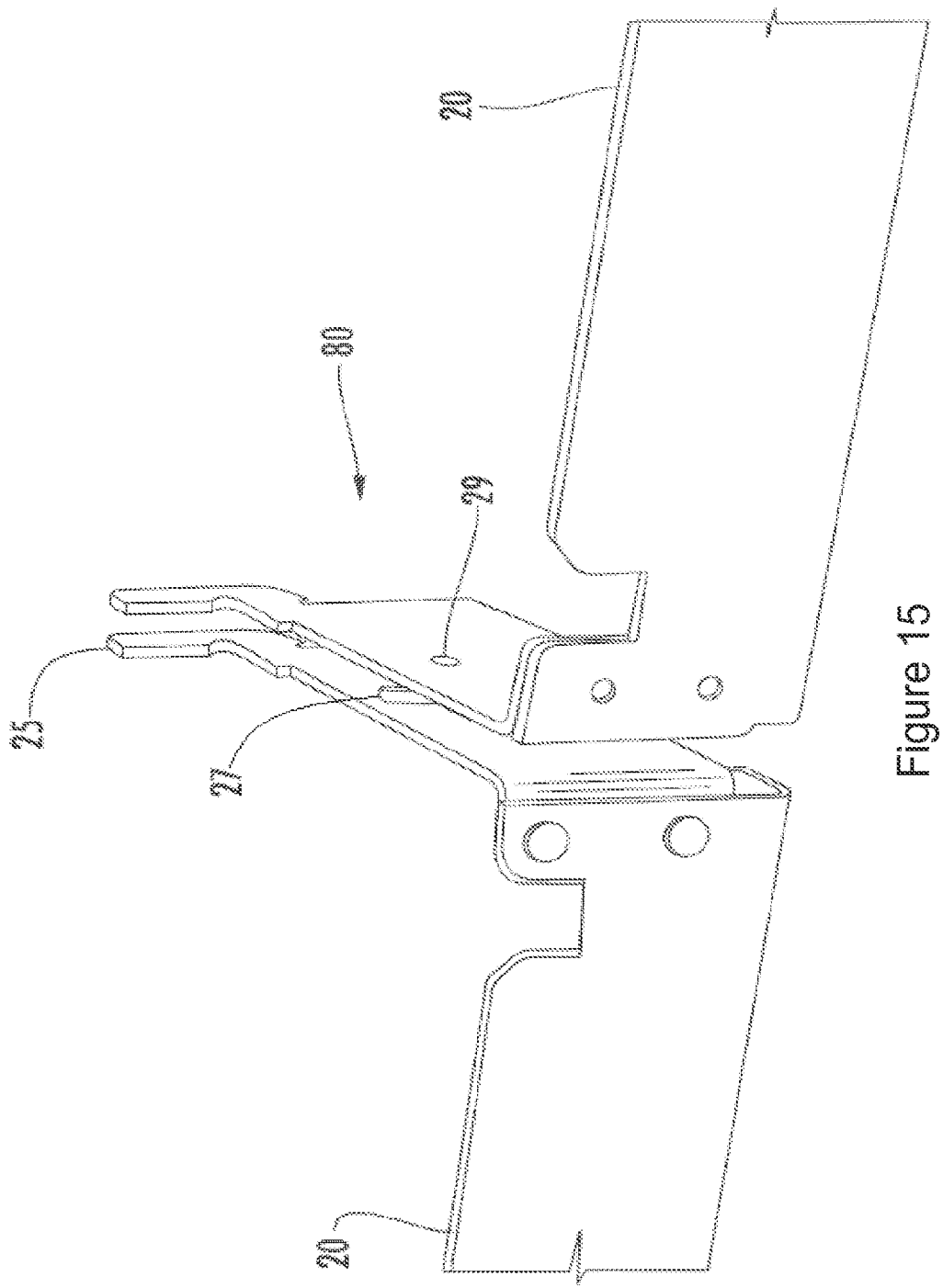

US 9,003,629 B2

ANGLED SUPPORT FOR DISPLAYING PRODUCTS

CROSS-REFERENCE TO RELATED APPLICATIONS

This application is a continuation of U.S. application Ser. No. 13/752,018 filed on Jan. 28, 2013, which is a divisional of U.S. application Ser. No. 11/769,894 filed on Jun. 28, 2007, now U.S. Pat. No. 8,360,254, which claims priority to provisional application Ser. No. 60/806,101, filed Jun. 28, 2006. All of the above applications are incorporated herein by reference in their entirety.

BACKGROUND OF THE INVENTION

1. Field of the Invention

The present invention relates to the field of supports used to display products in a retail environment.

2. Description of Related Art

Retail environments often need to display a wide variety of products that range in size. One method of doing so is to provide a vertical support, which may be supported by a based or mounted to a wall, which in turn supports a peg board. The vertical support may include a series of repeating holes that provide mounting points for various display supports such as shelves and peg hooks. The peg board may also provide a series of repeating holes, which may be aligned with the holes in the vertical support. While this system has been useful for displaying products and provides a degree of flexibility regarding the use of shelves or peg hooks, the vertical nature of the vertical support and the joining peg board tends to cause items on display to be directly above or below each other. Certain retail locations would benefit from the ability to provide a display that allows for an angled presentation of products.

BRIEF SUMMARY OF THE INVENTION

An embodiment of a support structure is disclosed that may be mounted to a set of vertical supports. In an embodiment, the support structure may include a first horizontal support member in a first upper position, a second horizontal support member in a second position and a third horizontal support in a third position between the first and second position. Two or more vertical uprights may be mounted to the horizontal supports so as to provide an effective angled support surface. Between two vertical uprights, a peg board panel may be mounted. Channels in the vertical uprights may be used to hold the peg board panel in position. The vertical uprights may include tabs that are configured to engage slots in the horizontal supports so that the support structure may be mounted to the vertical support without the need to use a tool or fastener. In an embodiment, two support structures may be joined together with one or more fasteners so as to form a row of angled support structures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which:

FIG. 15 is an isometric view of an embodiment of two horizontal supports configured to be coupled together.

DETAILED DESCRIPTION OF THE INVENTION

Figure 1:
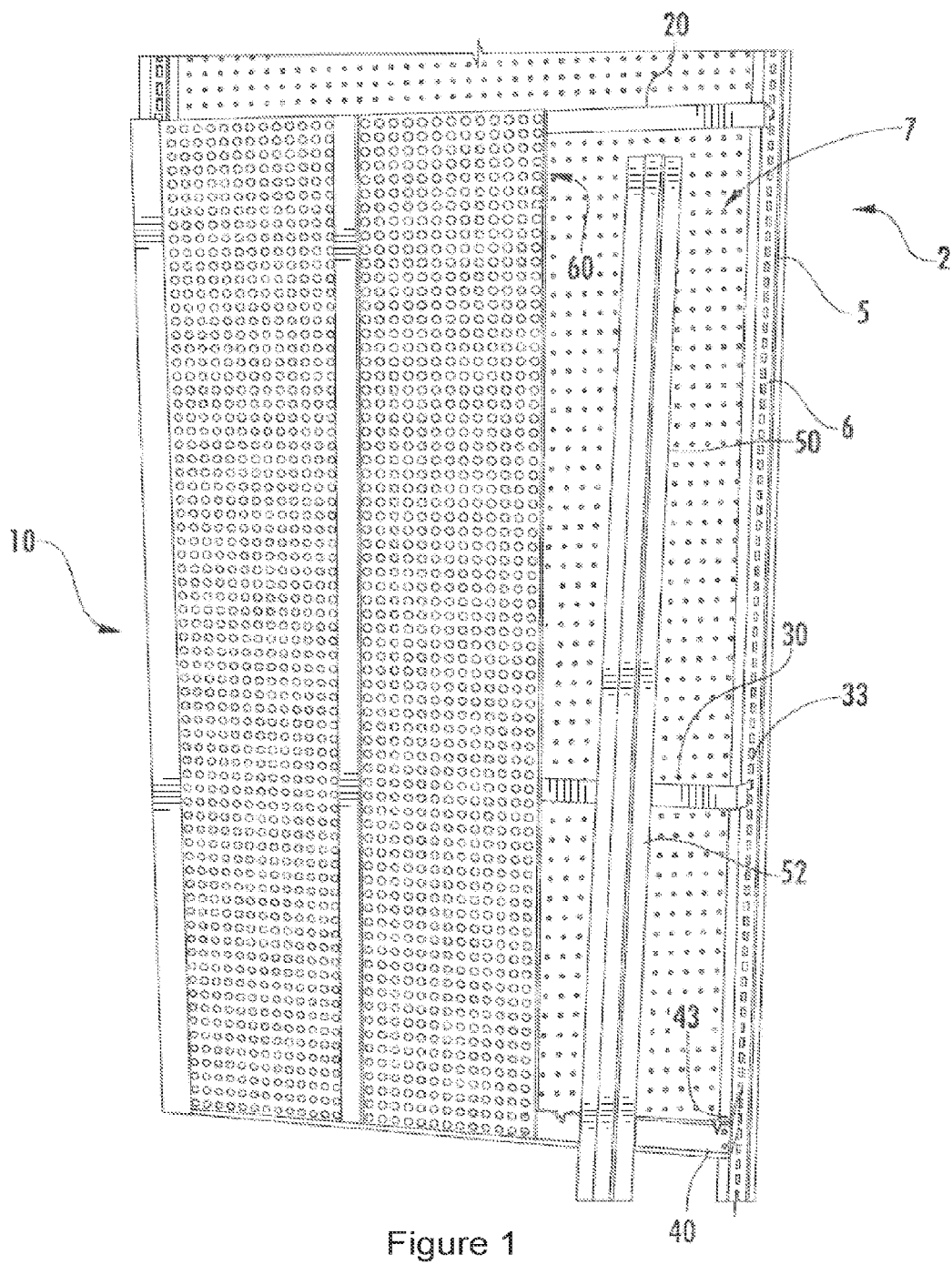
FIG. 1 is an isometric view of an embodiment of a support structure.
Figure 2:
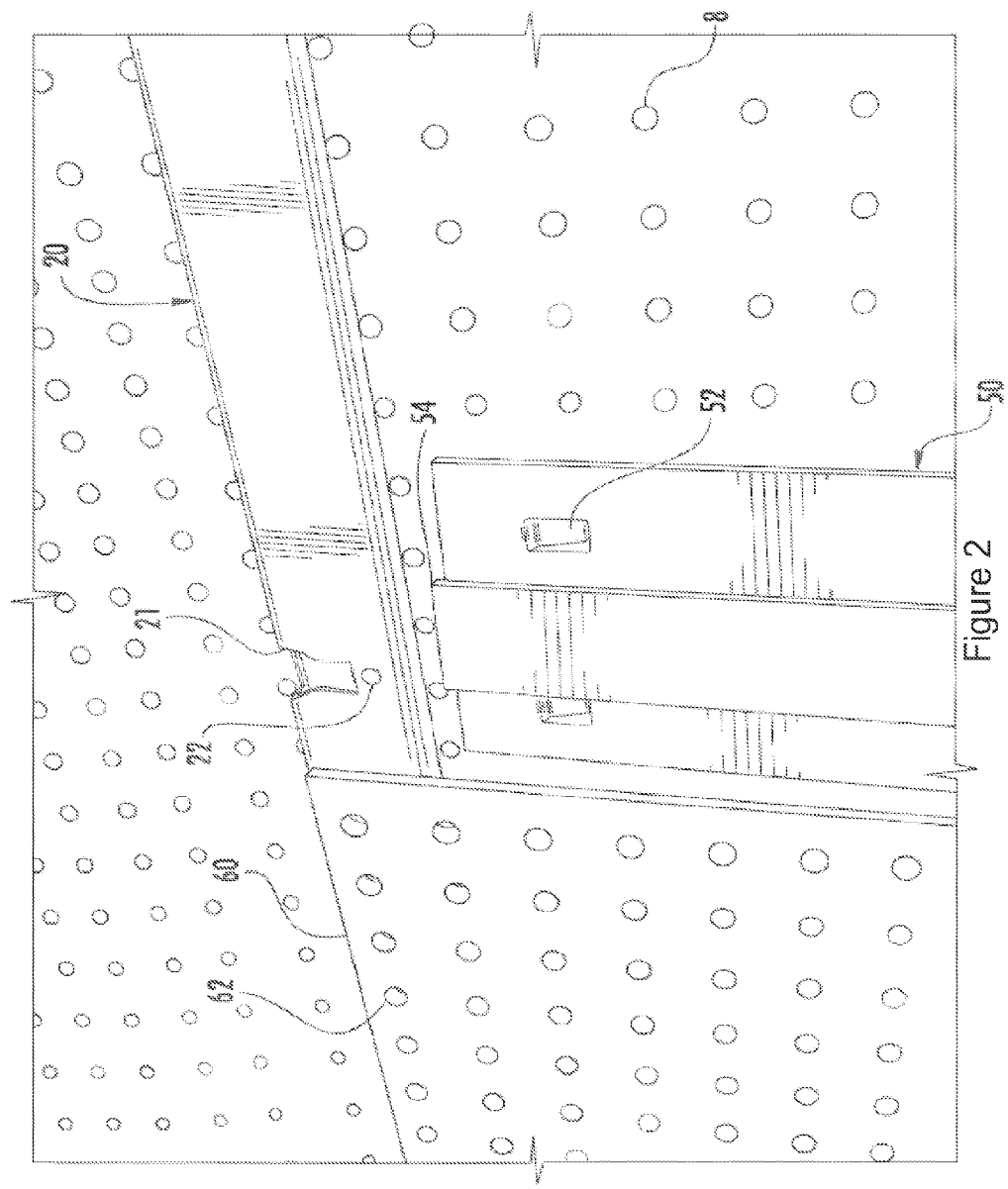
FIG. 2 is an isometric view of an embodiment of a first horizontal support configured to receive a vertical upright.
Figure 3:
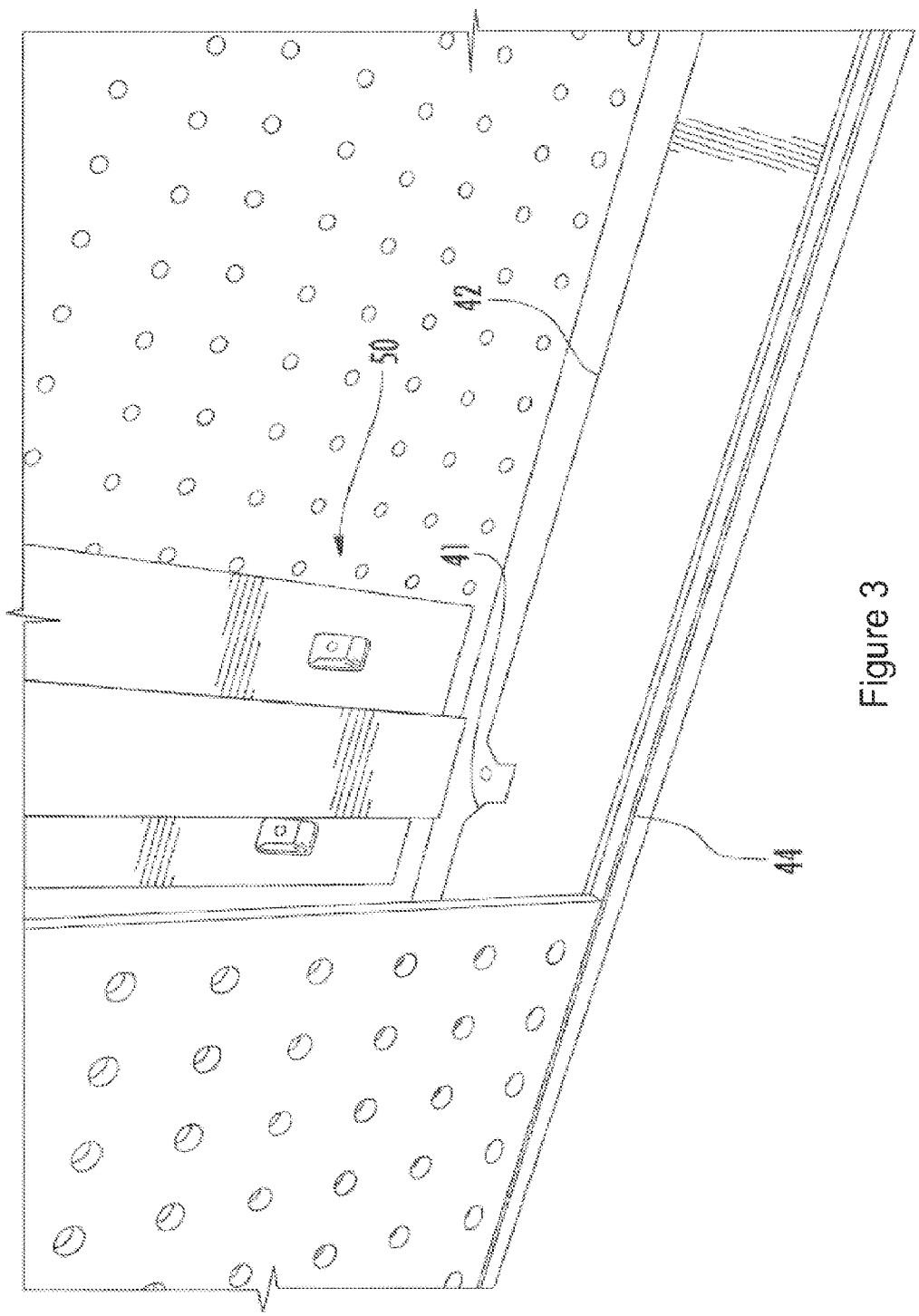
FIG. 3 is an isometric view of an embodiment of a second horizontal support configured to receive a vertical upright.
Figure 4:
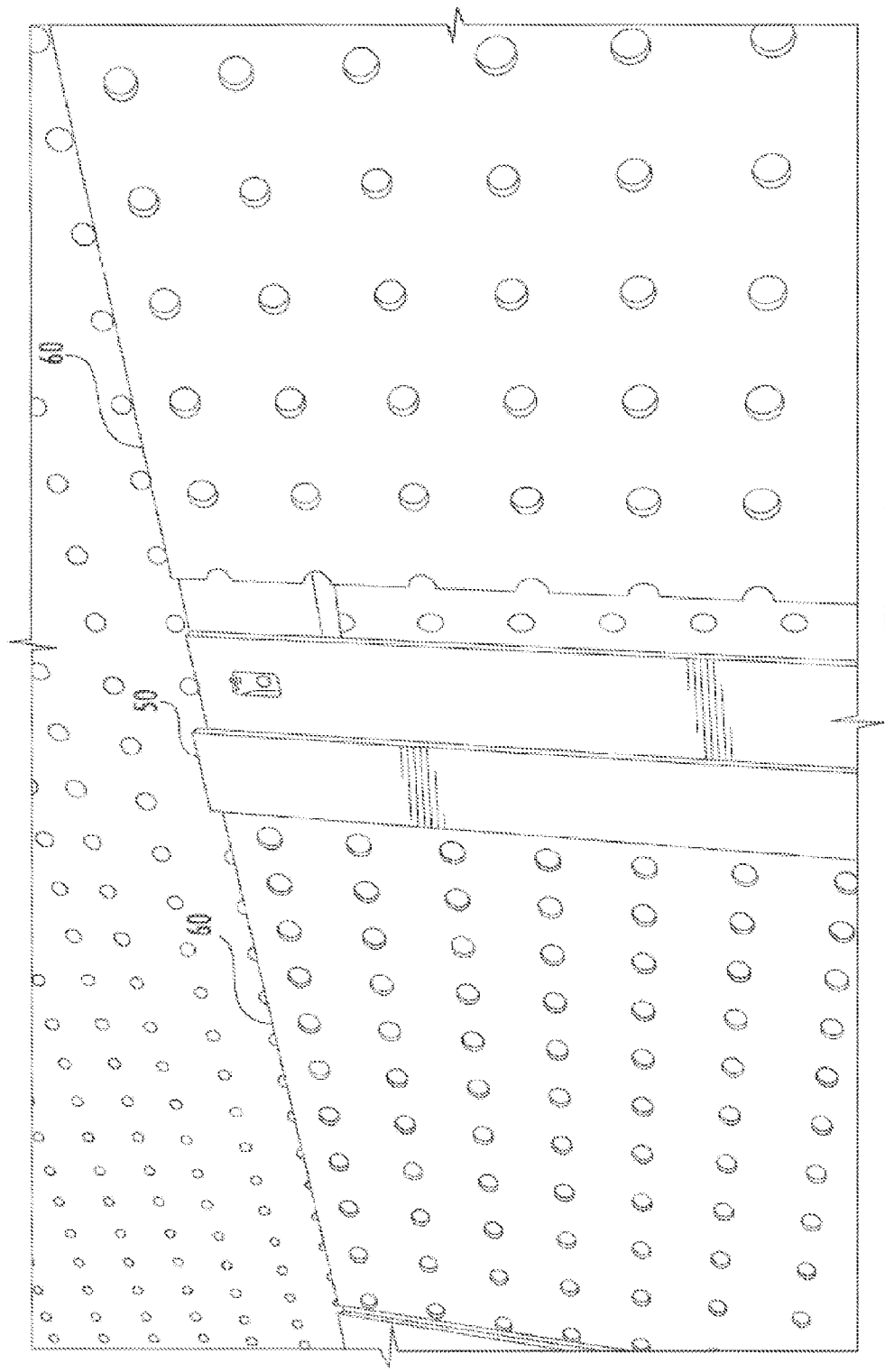
FIG. 4 is an isometric view of an embodiment of a vertical upright mounted to a horizontal support.
Figure 5:
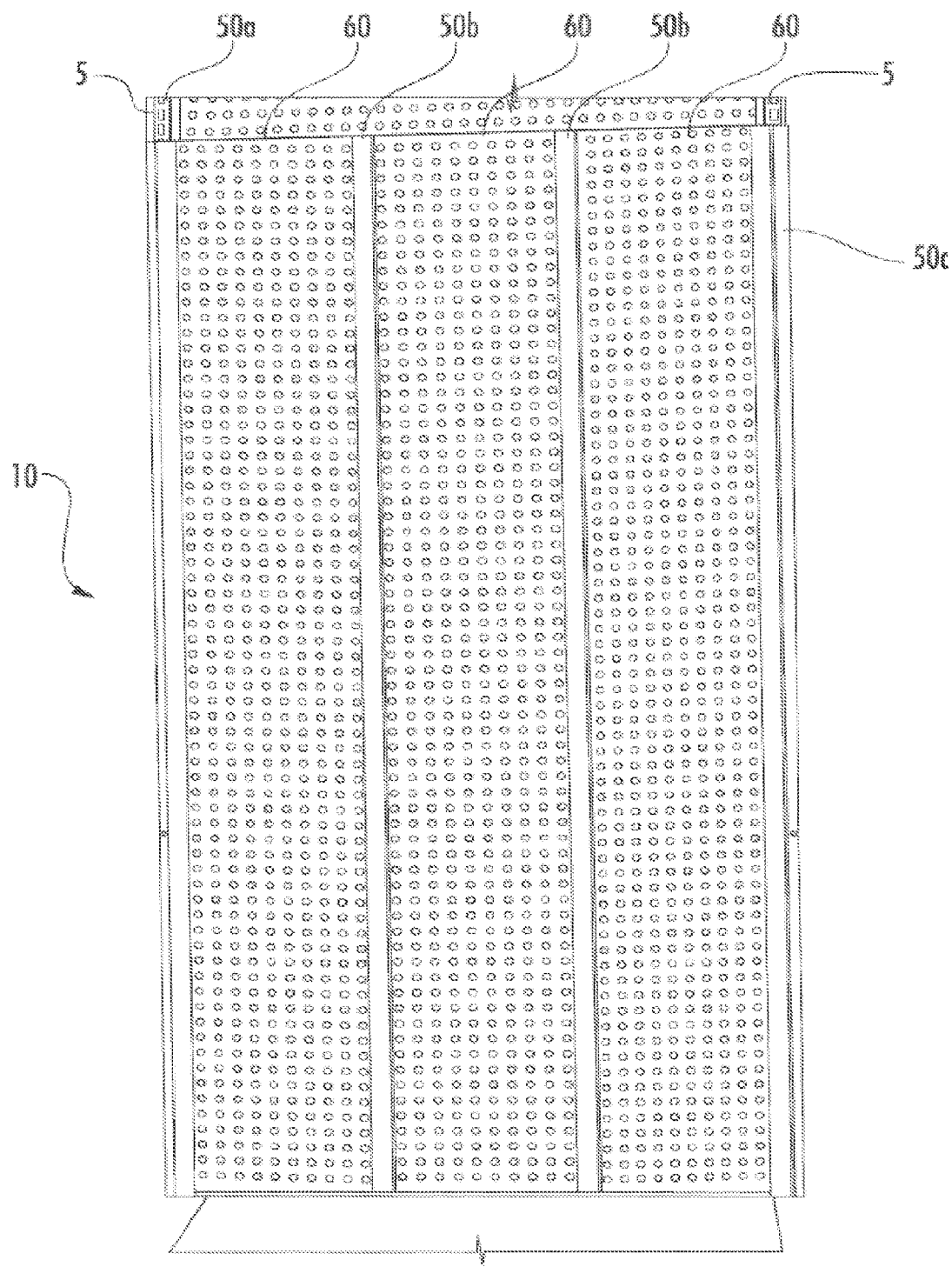
FIG. 5 is an isometric view of an embodiment of a support structure mounted to a vertical support.
Figure 6:
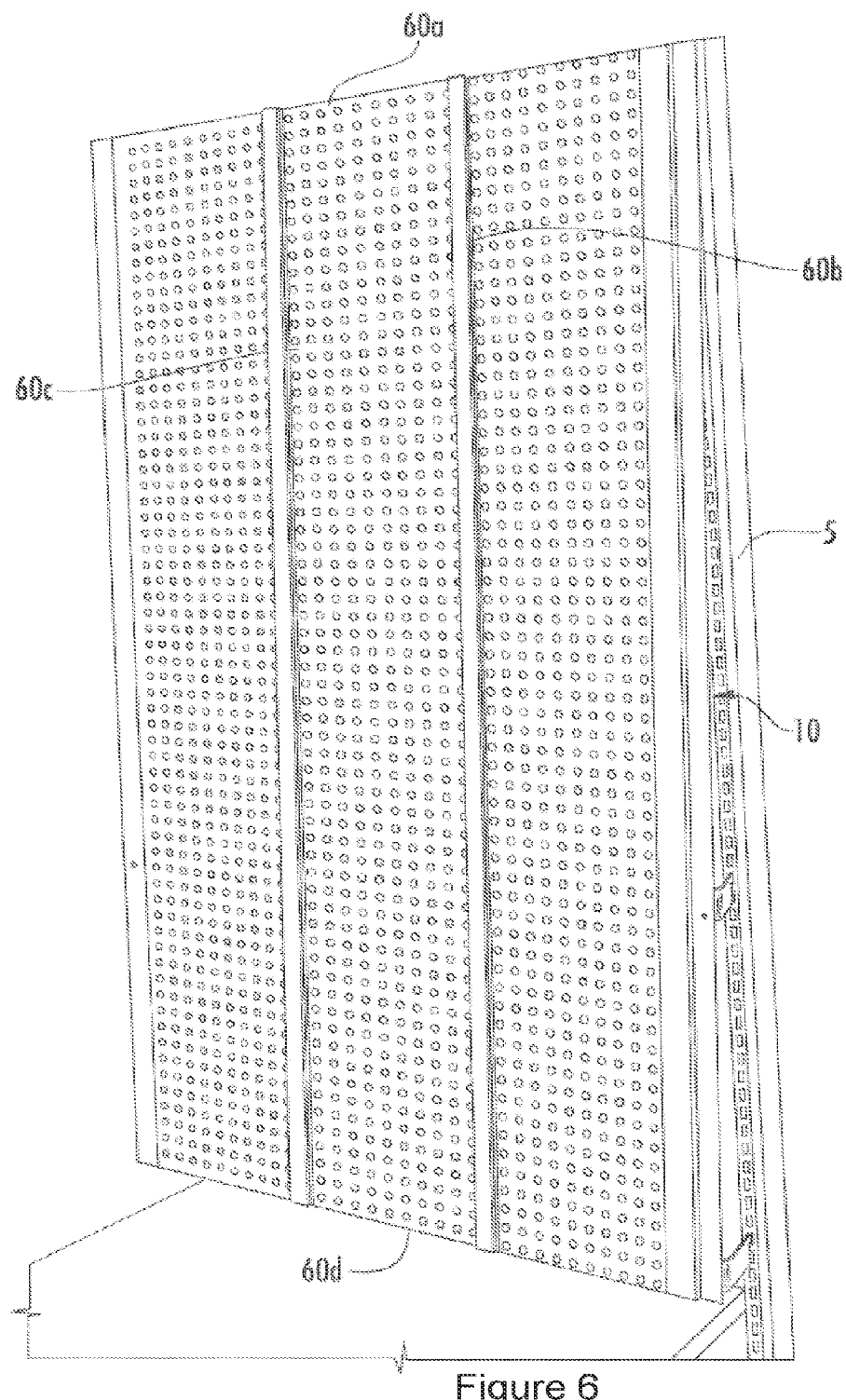
FIG. 6 is an alternative isometric view of the support structure depicted in FIG. 5 showing the angle of the support structure with respect to the vertical support.
Figure 7:
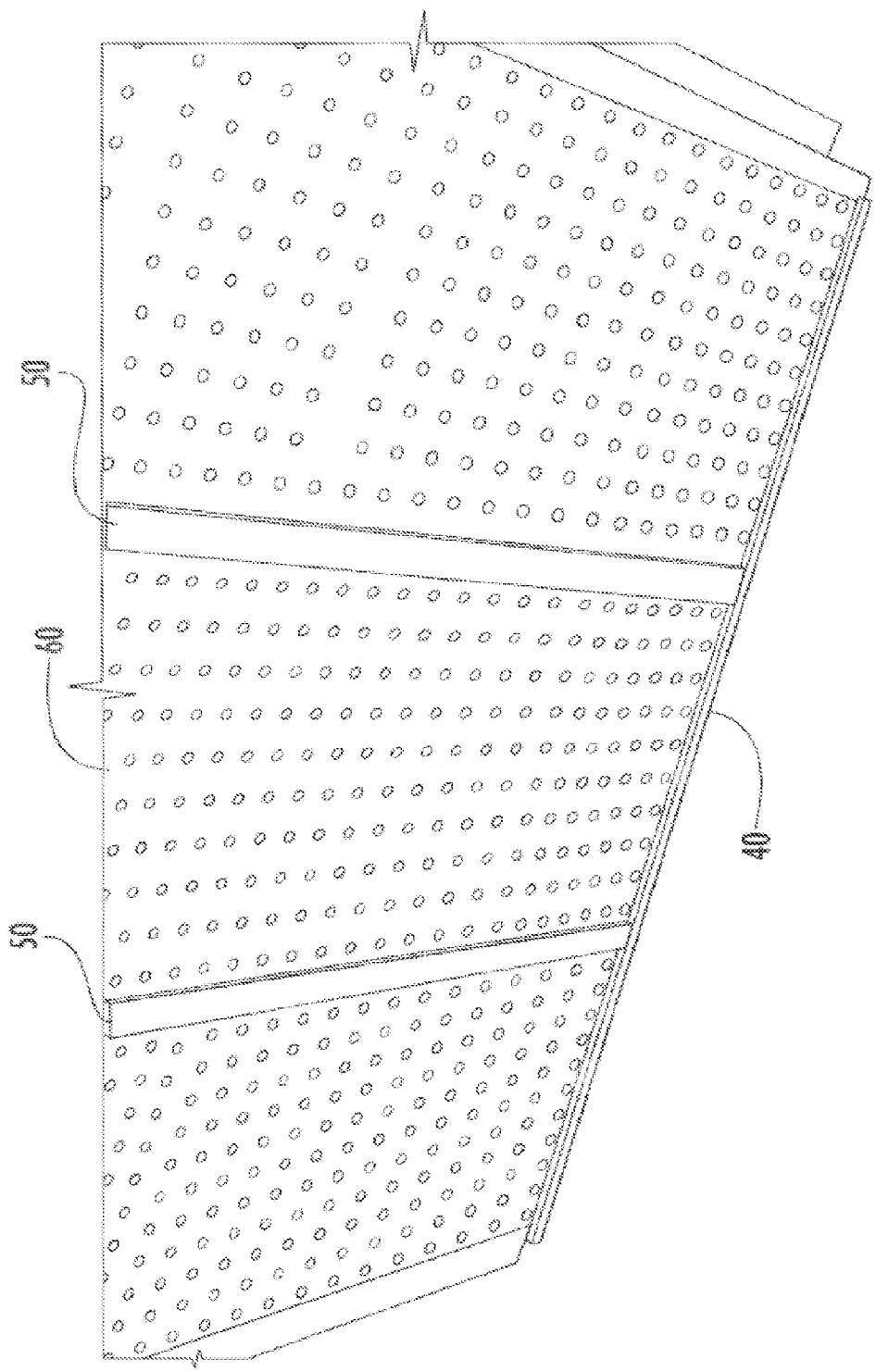
FIG. 7 is an isometric view of a portion of a support structure mounted to a vertical support.
Figure 8:
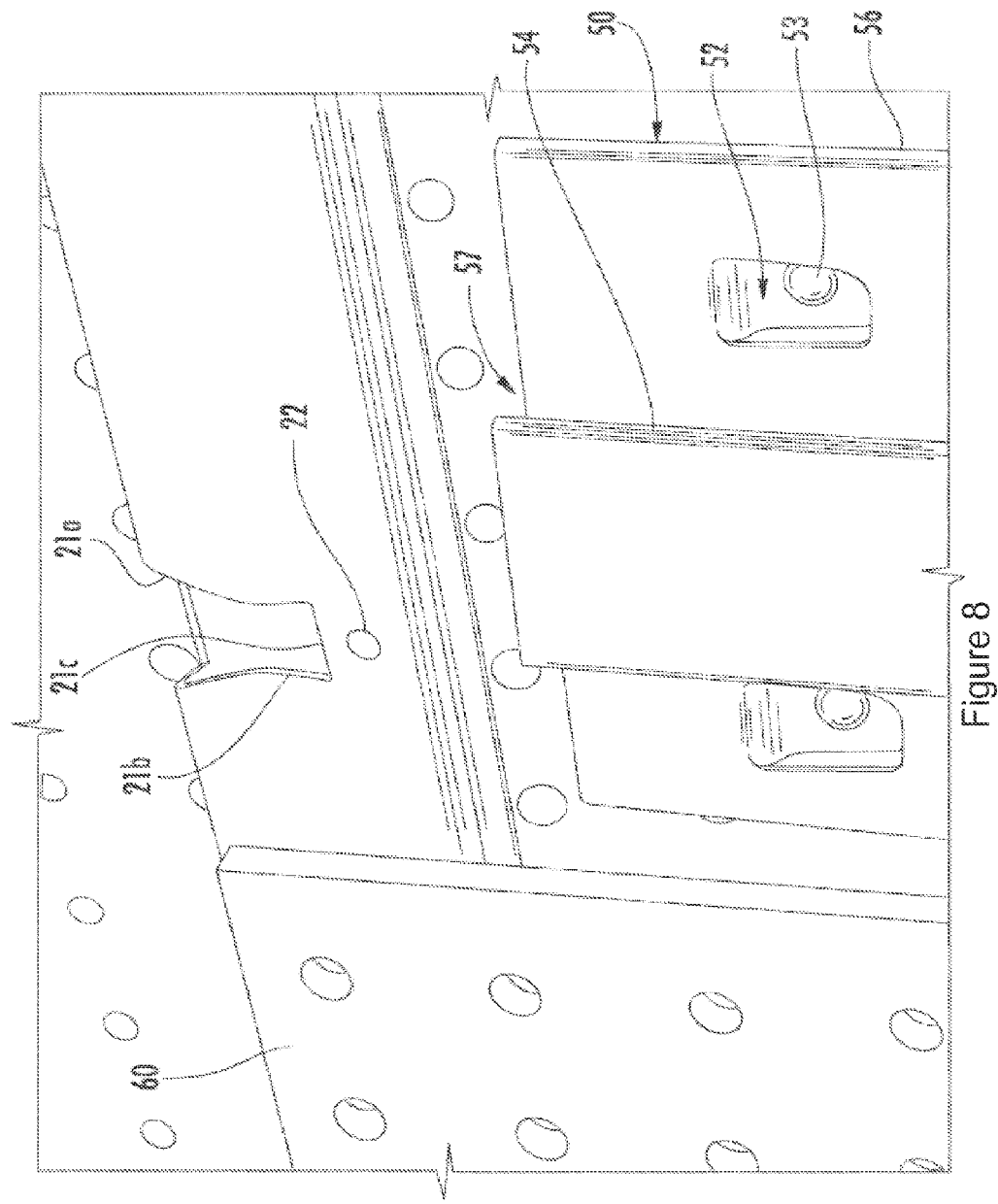
FIG. 8 is an enlarged isometric view of the horizontal support depicted in FIG. 2.
Figure 9:
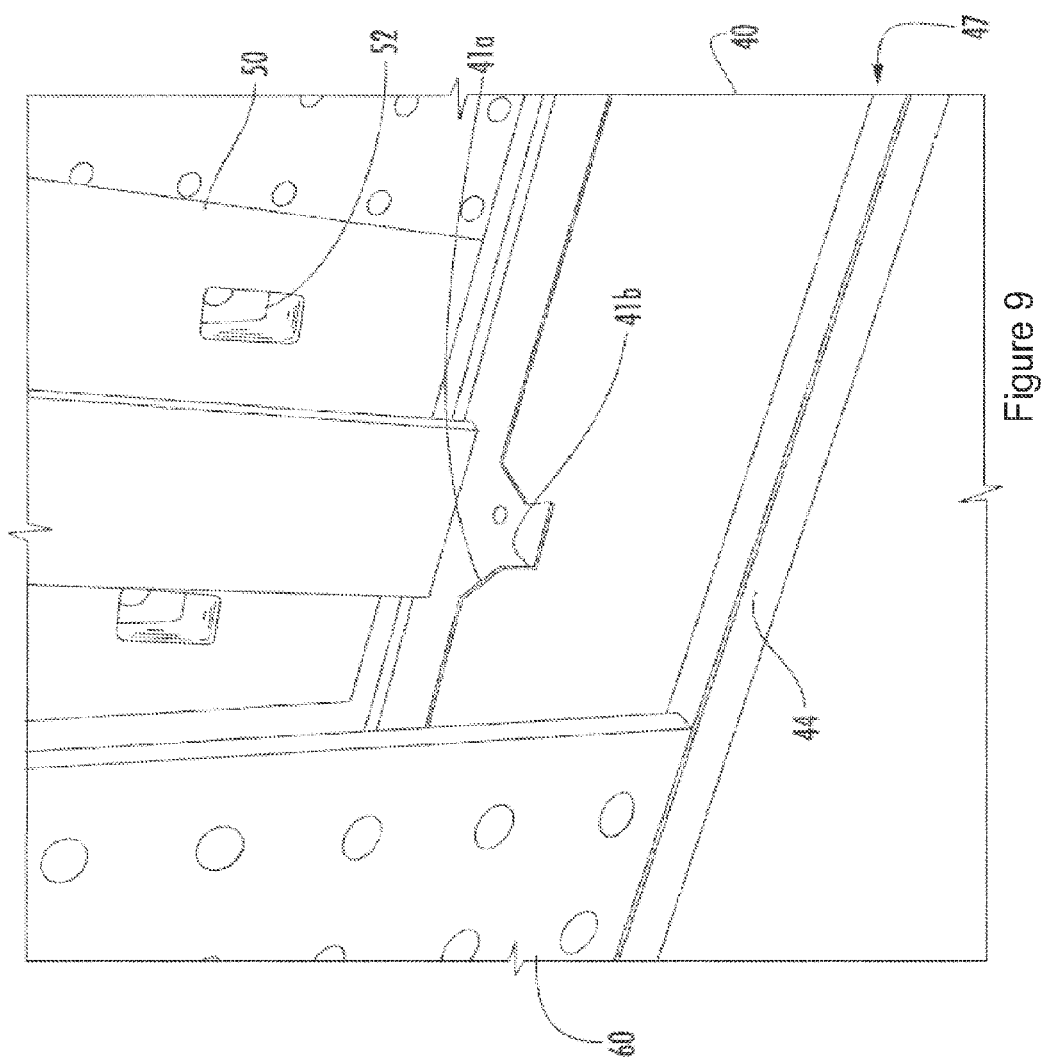
FIG. 9 is an enlarged isometric view of the horizontal support depicted in FIG. 3.
Figure 10:
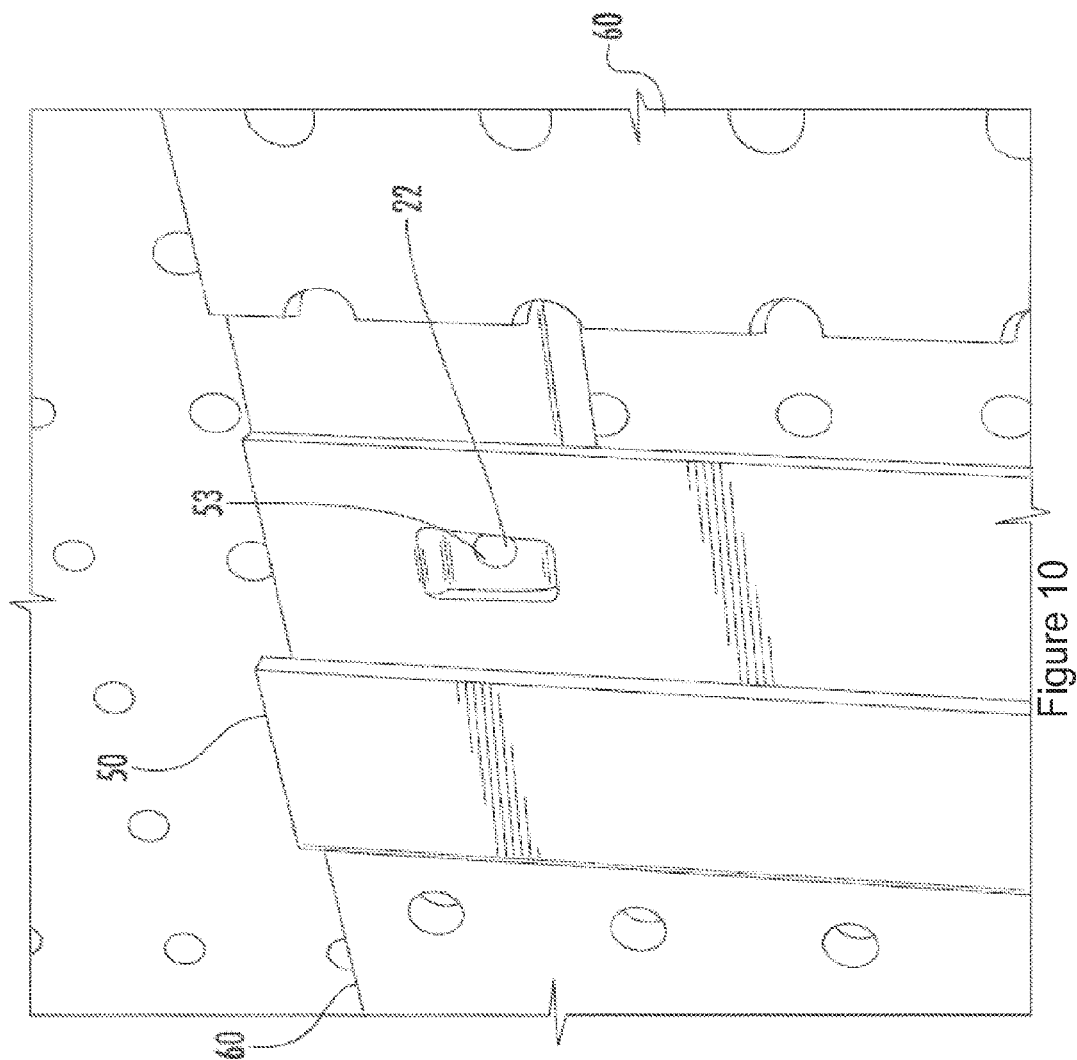
FIG. 10 is an enlarged isometric view of the vertical upright and horizontal support depicted in FIG. 4.
Figure 11:
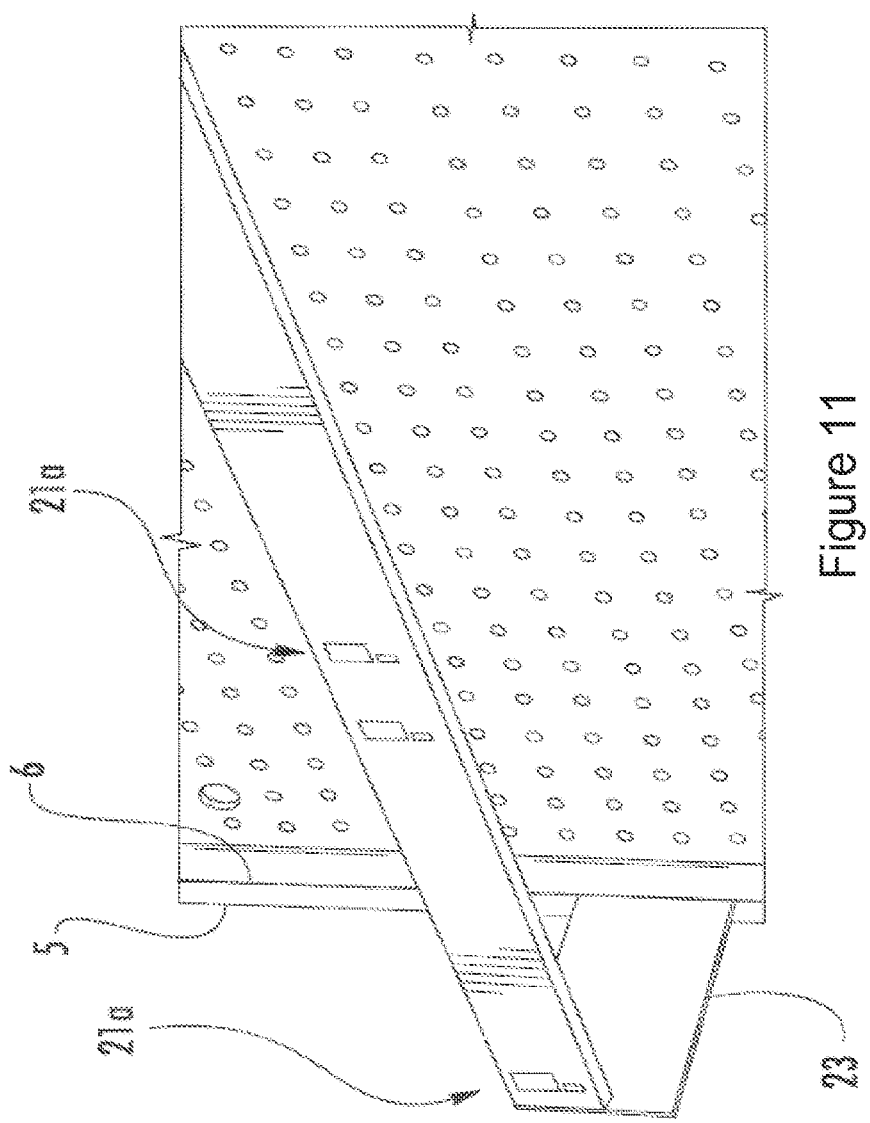
FIG. 11 is a partial isometric view of an embodiment of a horizontal support.
Figure 12:
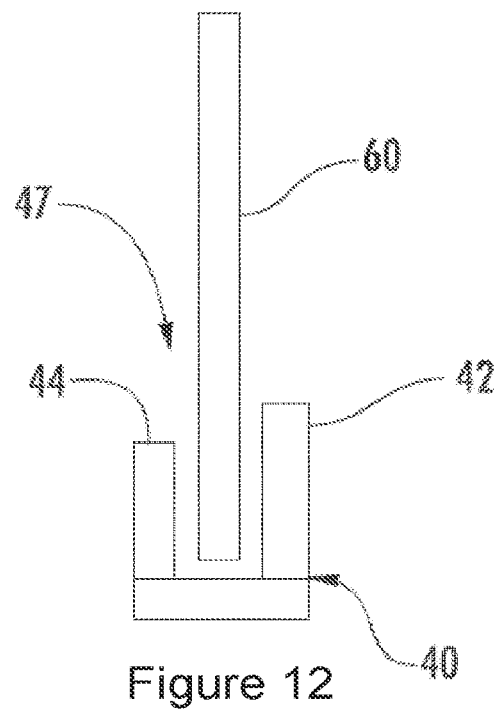
FIG. 12 is a schematic cross section of an embodiment of a peg board panel engaging a second horizontal support.
Figure 13:
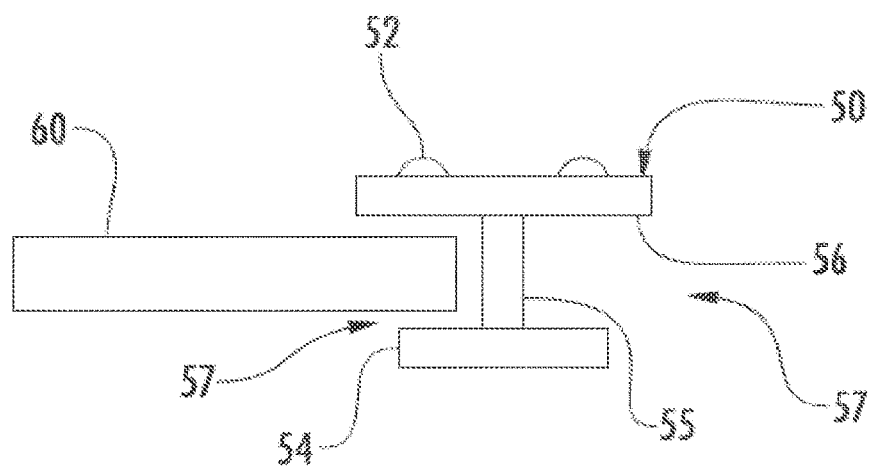
FIG. 13 is a schematic cross section of an embodiment of a peg board panel engaging a vertical upright.
Figure 14:
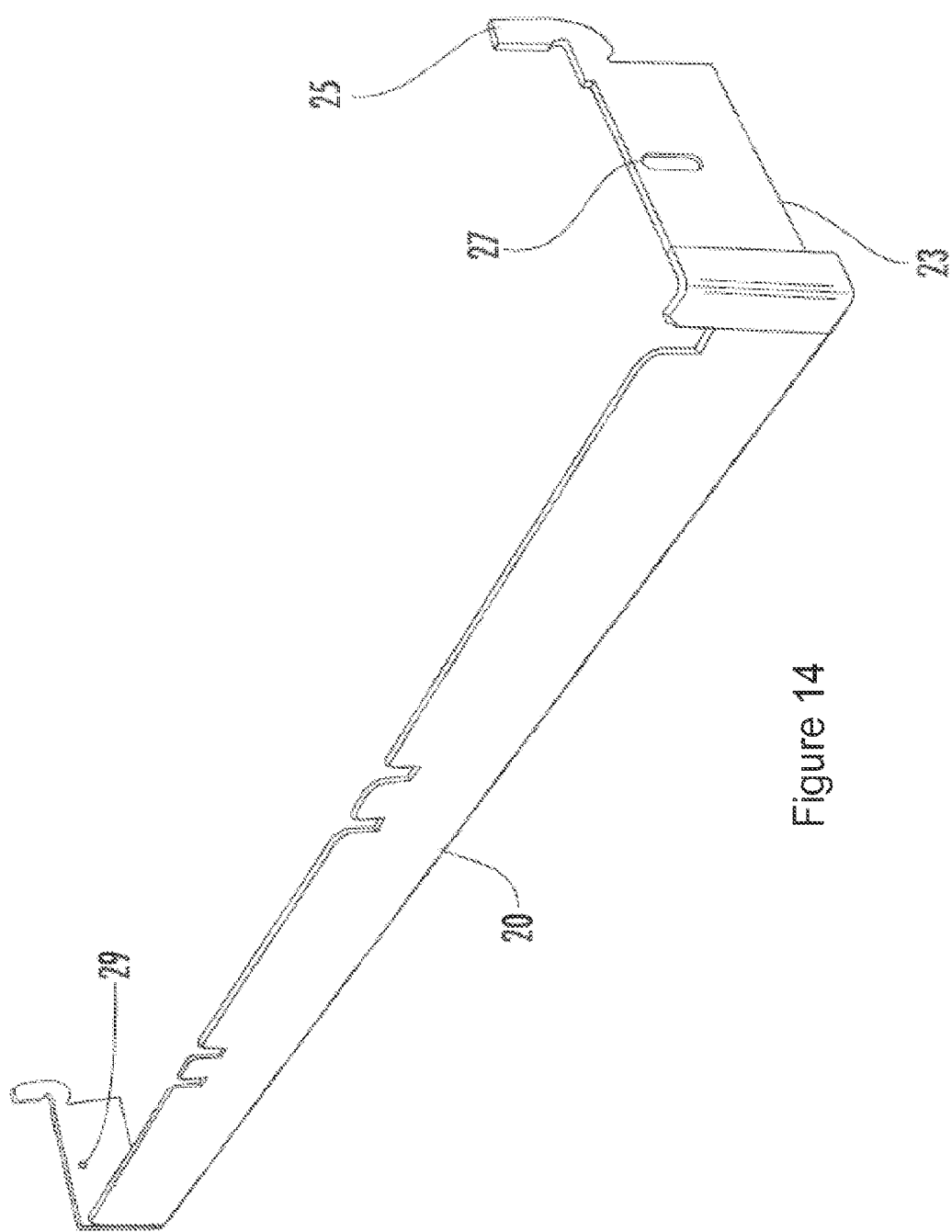
FIG. 14 is an isometric view of an embodiment of a horizontal support including an arm.

Looking at FIGS. 1-15, an embodiment of a support system 10 is depicted. Two vertical supports 5 with holes 6 are provided with a peg board 7 that includes holes 8 extending between them. As can be appreciated, this is similar to a typical peg board installation in that the peg board 7 is mounted in a vertical manner. While the vertical supports 5 are depicted mounted to a wall 2, it should be noted that the vertical supports 5 may also be supported by a base. A first horizontal support 20 is mounted in a first position extending between the two vertical supports 5. A second horizontal support 40 is mounted to the two vertical supports at a second position below the first position. A third horizontal support 30 is mounted to the vertical supports 5 in a third position between the first and the second position.

In an embodiment, each of the horizontal supports 20, 30, 40 includes an arm on each end of the horizontal support, such as an arm 23 provided for the first horizontal support 20. The arms allow the horizontal supports to be positioned so that they are offset with respect to the vertical supports. However, to provide an angled support structure 10, the length of the respective arm increases for each successive horizontal support, thus a length of an arm 43 for the second horizontal support 40 is greater than the length of the arm 23 for the first horizontal support 20. Furthermore, the length of the arm 43 of the second horizontal support 40 is greater than the length of an arm 33 of the third horizontal support, which in turn has a length greater than the length of the arm 23.

The length of the arms 23, 33, 43 provides an effective slope that allows a vertical upright 50 to be supported by the horizontal supports 20, 30, 40 in an angle compared to the vertical support 5. When a peg board panel 60, which may include a pattern of holes 62, is supported at the depicted angle it can provide the advantage of allowing for waterfall type display that helps improve the visibility of each product. The resultant angle of the peg board panel may be varied so as to take into account the load being placed on the peg board panel as well as the resultant increase in the depth of the display while also taking into account the visual appearance of products that are subsequently mounted to the peg board panel 60. It should be noted that while the depicted vertical support 50 is linear, this is not a requirement but is merely advantageous because it can simplify assembly. For example, the ratio of distance between the locations of the horizontal supports can be maintained even if the overall length of a supported peg board panel 60 is reduced (and the vertical uprights are simply shortened). In contrast, the use of curved vertical uprights would require additional care regarding the placement of the horizontal supports so as to ensure the installation was as desired.

The vertical upright 50 may include one or more tabs 52 that are configured to engage slots in the horizontal supports, such as a slot 21 in horizontal support 20. The horizontal support 20 may further include an optional retaining hole 22, which while not required, provides the benefit of ensure that the vertical uprights 50 remain installed once an engaging feature 53 on the tab 52 engages the retaining hole 22. To ease disassembly of the system, the optional engaging feature 53 may be included only on the upper tab 52. As depicted, the vertical upright 50 includes two tabs 52; however, depending on the geometry of the slot 21 and the tab 52, some other number of tabs 52 and associated slots may be used to mount the vertical uprights 50 to the horizontal supports 20, 30, 40. In addition, the number of tabs and slots may be varied depending on the position of the vertical upright 50. For example, a left style vertical upright 50*a*, which may be positioned on an edge of the support structure, may include a single tab 52 to engage a single slot 21 in each of the horizontal supports used while a middle style vertical upright 50*b* may include two tabs to engage two slots. It should be noted that the slots and tabs may be interchanged although such a design may make it more difficult to install the vertical uprights.

Once a first vertical upright 50 is mounted to the horizontal supports (which are depicted as being three horizontal supports but depending on the size and materials properties may be some other number), a peg board panel 60 may be positioned next the vertical support 50. To retain the peg board panel 60 in position, an outer wall 54 is provided on the vertical upright. In the depicted embodiment, the vertical upright 50 may include the outer wall 54, an inner wall 56 and a joining wall 55 so as to effectively provide a "T" shaped structure that could retain a peg board panel 60 on two sides of the vertical upright 50. Alternatively, the outer wall may be configured so as to effectively provide an "L" shaped vertical support for retaining the peg board panel 60 on one side of the vertical upright 50. As can be appreciated, such a flexible design allows for a left style vertical upright 50*a*, a middle style vertical upright 50*b* and a right style vertical upright 50*c*. Depending on the design of the slot and associated tabs, the left and right style vertical uprights 50*a*, 50*c* may have a different number of tabs than the middle style vertical upright 50*b*.

In an embodiment the slot 21 may include a larger opening 21*a* and neck down to an engaging portion 21*b* near a bottom 21*c* of the slot 21. Such a design provides the advantage of easier assembly while still maintaining a reasonably solid support structure once the vertical uprights are assembled to the horizontal supports. The other slots may also include a similar design.

As noted above, the peg board panels 60 extend between two vertical uprights and may include holes 62 for support peg hooks and the like. The peg board panel may also include a graphic that provides a desired theme for the products that intend to be positioned on the support structure. It should be noted that because of the ability to remove the vertical uprights, the peg board panels and/or it graphic can be modified after installation. This provides the advantage of allowing for customized displays that can be changed if the product or the marketing theme changes. Thus, it is a less complicated and time consuming task to change the peg board panels if there is a desire to change the graphic. An individual can simply remove a vertical upright, replace the peg board panel with another peg board panel, and then reinstall the vertical upright. If multiple panels are provided, then it may be necessary to remove more that one vertical upright.

The peg board panel includes a top 60*a*, two sides 60*b*, 60*c* and a bottom 60*d*. As depicted, the sides 60*b*, 60*c* and the bottom 60*d* of the peg board panel 60 are supported. If an open top design is used (e.g., the peg board panel 60 is not restrained at its top 60*a*) then it may be possible to slide the peg board panel 60 in and out of the support structure. However, if channels 57 in the vertical uprights 50 are too snug to allow the peg board 60 to slide (such a design provides the benefit of preventing the peg board panel 60 from moving once installed) or if there is insufficient clearance above the support structure, then the vertical uprights 50 will need to be uninstalled before the peg board panel 60 can be replaced.

To support the peg board panels 60, a lip 44 is provided in the third horizontal support 40. This provides another effective channel 47 to secure the bottom 60*d* of the peg board panel. Thus, the peg board panels 60 may be supported on the bottom 60*d* and two sides 60*b*, 60*c* but, because of the influence of gravity, do not need to be support on the top 60*a*.

Once the support structure 10 is assembled, products may be mounted on it. It should be noted that the support structure 10 may be configured for any desirable angle and the angle can be changed if the horizontal supports are modified by, for example, removing the vertical uprights and the peg board panel 60 and then replacing one or more horizontal supports before reinstalling the vertical uprights 50 and the peg board panels. It should also be noted that the support structure 10 may include one or more peg board panels. In an embodiment, each peg board panel 60 (along with the associated vertical uprights 50) may add an additional foot to the support structure. An advantage of such a design is that the same basic components may be used to provide a support structure 10 for vertical supports where, for example but without limitation, the vertical supports are spaced apart about two feet, three feet or four feet. Furthermore, as the vertical uprights help support the peg board panels, a one foot wide panel is suitable to support a wide range of products. However, other dimensions may also be used for the peg board panels 60, thus the height and width of the peg board may be varied as desired.

It should be noted that if left and right vertical uprights 50*a*, 50*c* are used, the left and right vertical uprights 50*a*, 50*c* may be configured so as to allow a right and left vertical upright 50*a*, 50*c* to be mounted adjacent one anther so as to provide a continuous run of support structures 10. To provide additional support and rigidity, two adjacent horizontal supports may be held together at a fastener junction 80. For example, a nut and a screw (not shown) may engage a slot 27 and a hole 29. As can be appreciated, the use of the slot allows the two arms to be aligned even if the finger 25 is not fully inserted into the holes 6 of vertical support 5. Other known fastener systems may also be used so as to provide an extended run of support structures that are connected together. In an alternative embodiment, a middle style vertical upright 50*b* can be used to straddle two horizontal supports (such as horizontal support 20) that are joined together.

To provide for possible variations in installation of the vertical supports 5 to which the horizontal supports 20, 30, 40 are mounted to, the arms 23, 33, 43 of the horizontal supports may include an angled finger 25 (FIG. 14) that engage the holes 6 of vertical support 5. The use of the angled finger 25 to support the arms 23, 33, 43 provides the advantage of allowing adjacent horizontal supports to have their height adjusted slightly so as to allow two adjacent horizontal supports to become aligned with each other even if the original installation of the vertical supports did not perfectly align the vertical supports. Thus, the design of the finger 25 allows two adjacent arms to be coupled together at a fastener junction 80 while still engaging the holes 6 in the vertical support 5. To accomplish this, the finger 25 may be configured to be smaller than the size of the hole 6 so that the finger 25 can be moved up while installed (the force of gravity will tend to cause a fully down position to be a default position of the finger 25). As can be appreciated, such a design makes it simpler to provide a run or series of support structures with a consistent height. This has the advantage of minimizing the effect in variations in the height/vertical alignment of vertical supports 5 and also helps provide a cleaner looking installation.

The present invention has been described in terms of preferred and exemplary embodiments thereof. Numerous other embodiments, modifications and variations within the scope and spirit of the claims provided below will occur to persons of ordinary skill in the art from a review of this disclosure.

We claim:

1. A method for providing a cascading support for items being displayed in a retail establishment, comprising:
   mounting a first horizontal support to a set of vertical supports, the set of vertical supports positioned at a first angle;
   mounting a second horizontal support with a first channel to the set of vertical supports;
   mounting a first vertical upright with a second channel on the first and second horizontal supports;
   mounting a peg board panel in the first channel and the second channel, the mounting of the peg board panel causing the peg board panel to be inclined with respect to the first angle; and
   mounting a second vertical upright with a third channel on the first and second horizontal supports, the mounting of the second vertical upright causing the third channel to engage the pegboard panel.

2. The method of claim 1, further comprising:
   mounting a third horizontal support between the first and second horizontal supports, wherein the first and second vertical uprights are further supported by the third horizontal support.

3. The method of claim 1, wherein the mounting of the first vertical upright includes:
   engaging a first slot in the first horizontal support with a first tab in the vertical upright, and
   engaging a second slot in the second horizontal support with a second tab in the vertical upright.

4. The method of claim 1, wherein the peg board panel is a first panel with a first graphic, the method further comprising:
   replacing the first peg board panel with a second peg board panel having a second graphic.

5. The method of claim 4 comprises:
   removing a second vertical upright; and
   removing the first peg board panel from the first channel;
   inserting the second peg board panel in the first channel; and
   in response to inserting the second peg board panel, mounting the second vertical upright to the first horizontal support.

6. The method of claim 1, further comprising:
   prior to mounting the first vertical upright, mounting a third horizontal support between the first and the second horizontal support, the third horizontal support configured to support the first and the second vertical upright.

* * * * *